United States
Van Orden

[11] 3,759,606
[45] Sept. 18, 1973

[54] HIGH MAGNIFICATION PROJECTION LENS
[75] Inventor: Lynn L. Van Orden, Holley, N.Y.
[73] Assignee: Bausch & Lomb Incorporated, Rochester, N.Y.
[22] Filed: Sept. 5, 1972
[21] Appl. No.: 285,978

[52] U.S. Cl. .............................................. 350/214
[51] Int. Cl. ............................................. G02b 9/64
[58] Field of Search .................................. 350/214

[56] References Cited
UNITED STATES PATENTS
3,656,839  4/1972  Trotta .................................. 350/214

*Primary Examiner*—John K. Corbin
*Attorney*—Frank C. Parker et al.

[57] ABSTRACT

An inverse telephoto lens having ten elements, none in contact, is useful as a microfilm projection or camera lens, having a magnification ratio of 180:1 and numerical aperture of 0.42.

5 Claims, 1 Drawing Figure

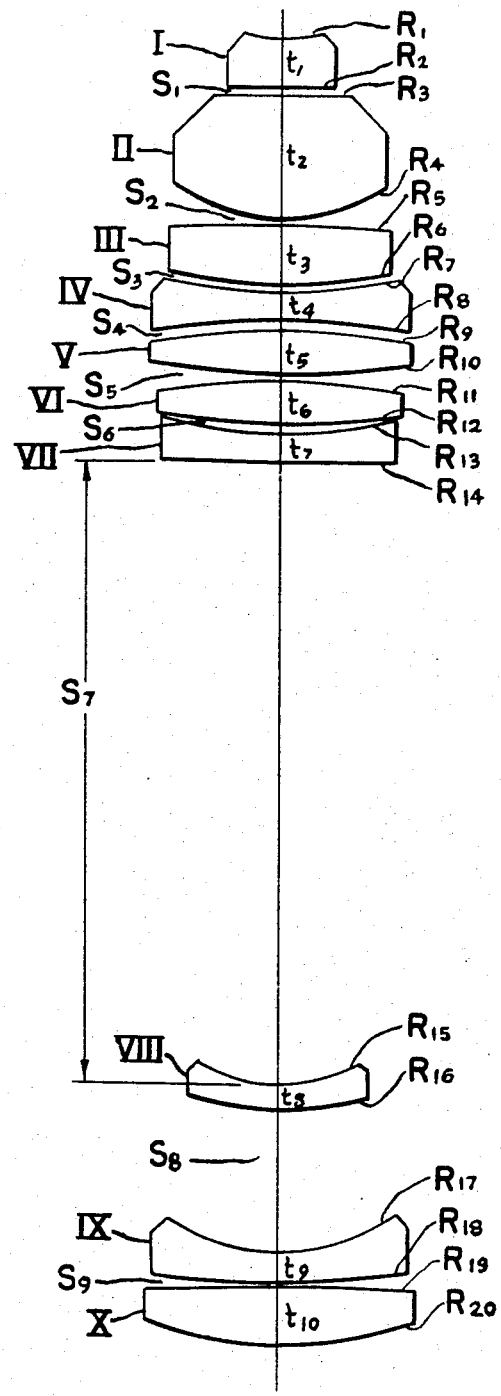

HIGH MAGNIFICATION PROJECTION LENS

BACKGROUND OF THE INVENTION

The invention lies in the field of multiple component lenses. Generally similar prior designs appear in U.S. Pat. No. 3,656,839 and patents cited therein.

SUMMARY OF THE INVENTION

The lens in question has 10 elements in two main groups, one of which is positive and one which is negative. Its magnification is 180X and the numerical aperture is 0.42. All of the lenses are airspaced from one another.

The positive group is toward the short conjugate and has first a negative meniscus lens I concave toward the short conjugate. It is followed by a thick positive meniscus lens II concave toward the short conjugate.

Next is a subgroup of three lenses, respectively a biconvex lens III, a biconcave lens IV and a biconvex lens V, and then a subgroup of two lenses, respectively a biconvex lens VI and a negative meniscus lens VII concave toward the short conjugate. All of said lenses together constitute a positive group and all are closely but distinctly airspaced from one another.

The next lens, which is the first lens of a negative group is spaced at least seven times the overall focal length away from said negative meniscus lens VII, and it is a negative meniscus lens VIII concave toward the short conjugate. The next lens is spaced almost two focal lengths away from lens VIII and it is a negative meniscus lens IX concave toward the short conjugate. It is closely spaced from a positive lens X with which the negative group is concluded.

It should be noted that the surfaces which define the spaces between lenses I and II and lenses IX and X are very nearly plano, and in particular designs such surfaces may be either of positive or negative radius, although their radii will always be of substantial absolute magnitude. The shape of the lenses defining such surfaces might therefore be described in different terms in two different examples of the same overall design. For example, a lens which is a negative meniscus in one design may become a plano-concave in the next design, or even a biconcave if the radius were to change sign. Those skilled in the art will therefore appreciate that the foregoing verbal lens description is subject to variations in phrasing to accommodate such shifts in sign for the long radii.

The lens is well corrected and it may be noted that the radii tend to be long and the surface curves therefore relatively shallow. Under these circumstances the corrections tend to be shared among the surfaces and the lens elements' fabrication, assembly and alignment is greatly facilitated.

DESCRIPTION OF EMBODIMENTS

The lens in question is subject to numerous variations in design, four of which are set forth, one in each column of the table below, where each element is described by the first order construction data, each radius R, thickness $t$, and space S, is subnumerated in increasing order from the short conjugate toward the long and is given as a ratio of the focal length $f$ as unity. The glass types, subnumerated as above, are given in refractive indices $n_D$ and dispersion values $v$. Radii concave toward the short conjugate are treated in the table as negative. Radii 18 and 19 particularly are sometimes positive and sometimes negative. They are therefore given as positive and the values themselves are shown as negative when the design so requires. Radii longer than 60f may be considered infinite and may be taken to include both positive and negative radii of such lengths.

| | | | | |
|---|---|---|---|---|
| $-R_1$ | 2.516$f$ | 2.362$f$ | 2.491$f$ | 2.447$f$ |
| $R_2$ | ±60$f$ | ±60$f$ | ±60$f$ | ±60$f$ |
| $R_3$ | ±60$f$ | ±60$f$ | ±60$f$ | ±60$f$ |
| $-R_4$ | 2.024$f$ | 2.020$f$ | 2.018$f$ | 2.018$f$ |
| $R_5$ | 54.417$f$ | 54.292$f$ | 54.235$f$ | 54.242$f$ |
| $-R_6$ | 3.007$f$ | 3.000$f$ | 2.997$f$ | 2.997$f$ |
| $-R_7$ | 3.007$f$ | 3.000$f$ | 2.997$f$ | 2.997$f$ |
| $R_8$ | 6.130$f$ | 6.116$f$ | 6.109$f$ | 6.110$f$ |
| $R_9$ | 6.657$f$ | 6.641$f$ | 6.634$f$ | 6.635$f$ |
| $-R_{10}$ | 6.000$f$ | 5.987$f$ | 5.980$f$ | 5.981$f$ |
| $R_{11}$ | 5.519$f$ | 5.507$f$ | 5.501$f$ | 5.502$f$ |
| $-R_{12}$ | 10.180$f$ | 10.156$f$ | 10.146$f$ | 10.147$f$ |
| $-R_{13}$ | 7.173$f$ | 7.116$f$ | 7.098$f$ | 7.141$f$ |
| $-R_{14}$ | 22.045$f$ | 21.023$f$ | 21.822$f$ | 21.536$f$ |
| $-R_{15}$ | 1.666$f$ | 1.674$f$ | 1.662$f$ | 1.673$f$ |
| $-R_{16}$ | 3.804$f$ | 3.467$f$ | 3.563$f$ | 3.700$f$ |
| $-R_{17}$ | 2.485$f$ | 2.602$f$ | 2.605$f$ | 2.557$f$ |
| $R_{18}$ | −17.343$f$ | ±60$f$ | −33.440$f$ | −27.281$f$ |
| $R_{19}$ | ±60$f$ | 35.265$f$ | ±60$f$ | ±60$f$ |
| $-R_{20}$ | 4.753$f$ | 5.106$f$ | 5.093$f$ | 4.860$f$ |
| $t_1$ | .571$f$ | .569$f$ | .569$f$ | .569$f$ |
| $t_2$ | 1.479$f$ | 1.476$f$ | 1.474$f$ | 1.474$f$ |
| $t_3$ | .722$f$ | .721$f$ | .720$f$ | .720$f$ |
| $t_4$ | .309$f$ | .309$f$ | .308$f$ | .308$f$ |
| $t_5$ | .501$f$ | .500$f$ | .499$f$ | .499$f$ |
| $t_6$ | .523$f$ | .521$f$ | .521$f$ | .521$f$ |
| $t_7$ | .311$f$ | .310$f$ | .310$f$ | .310$f$ |
| $t_8$ | .281$f$ | .280$f$ | .280$f$ | .280$f$ |
| $t_9$ | .361$f$ | .360$f$ | .359$f$ | .360$f$ |
| $t_{10}$ | .601$f$ | .600$f$ | .599$f$ | .599$f$ |
| $S_1$ | .019$f$ | .020$f$ | .020$f$ | .020$f$ |
| $S_2$ | .014$f$ | .014$f$ | .014$f$ | .014$f$ |
| $S_3$ | .065$f$ | .065$f$ | .065$f$ | .065$f$ |
| $S_4$ | .136$f$ | .136$f$ | .135$f$ | .135$f$ |
| $S_5$ | .019$f$ | .019$f$ | .018$f$ | .018$f$ |
| $S_6$ | .073$f$ | .089$f$ | .089$f$ | .089$f$ |
| $S_7$ | 7.126$f$ | 7.083$f$ | 7.127$f$ | 7.046$f$ |
| $S_8$ | 1.632$f$ | 1.754$f$ | 1.725$f$ | 1.754$f$ |
| $S_9$ | .010$f$ | .010$f$ | .010$f$ | .010$f$ |
| $n_{D1}$ | 1.620 | 1.620 | 1.620 | 1.620 |
| $n_{D2}$ | 1.620 | 1.620 | 1.620 | 1.620 |
| $n_{D3}$ | 1.720 | 1.720 | 1.720 | 1.720 |
| $n_{D4}$ | 1.691 | 1.691 | 1.691 | 1.691 |
| $n_{D5}$ | 1.691 | 1.691 | 1.691 | 1.691 |
| $n_{D6}$ | 1.720 | 1.720 | 1.720 | 1.720 |
| $n_{D7}$ | 1.691 | 1.691 | 1.691 | 1.691 |
| $n_{D8}$ | 1.691 | 1.691 | 1.691 | 1.691 |
| $n_{D9}$ | 1.720 | 1.720 | 1.720 | 1.720 |
| $n_{D10}$ | 1.526 | 1.526 | 1.526 | 1.526 |
| $v_1$ | 60.2 | 60.2 | 60.2 | 60.2 |
| $v_2$ | 60.2 | 60.2 | 60.2 | 60.2 |
| $v_3$ | 29.3 | 29.3 | 29.3 | 29.3 |
| $v_4$ | 54.8 | 54.8 | 54.8 | 54.8 |
| $v_5$ | 54.8 | 54.8 | 54.8 | 54.8 |
| $v_6$ | 29.3 | 29.3 | 29.3 | 29.3 |
| $v_7$ | 54.8 | 54.8 | 54.8 | 54.8 |
| $v_8$ | 54.8 | 54.8 | 54.8 | 54.8 |
| $v_9$ | 29.3 | 29.3 | 29.3 | 29.3 |
| $v_{10}$ | 60.0 | 60.0 | 60.0 | 60.0 |

Those skilled in the art will appreciate that minor variation in the above values may nevertheless be compensated for by certain well known assembly and alignment techniques. In the case of variations in glass types, it is thought that useful lenses could be assembled from elements whose refractive indices were within .002 of the values shown below, or whose dispersion values were within ±2 of those values.

Additionally, lenses failing to conform precisely to the above construction values may nevertheless be put to effective use in applications whose requirements are less stringent than those for which the lens is primarily intended.

I claim:

1. An inverted telephoto lens having 10 elements in two groups, none of said elements being in contact with one another, said elements having values of radii R which are negative when centered toward the short conjugate, thicknesses $t$ and spaces S ratioed to the focal length $f$ as unity, said elements comprising glasses of refractive indices $n_D$ and dispersions $v$, all of said values being subnumerated in increasing order from the short conjugate toward the long, and said values lying within the ranges set forth in the table below:

| | | | | |
|---|---|---|---|---|
| $2.362f$ | $\leq$ | $-R_1$ | $\leq$ | $2.516f$ |
| $-60f$ | $\geq$ | $R_2$ | $\geq$ | $\pm 60f$ |
| $-60f$ | $\geq$ | $R_3$ | $\geq$ | $\pm 60f$ |
| $2.018f$ | $\leq$ | $-R_4$ | $\leq$ | $2.024f$ |
| $54.235f$ | $\leq$ | $R_5$ | $\leq$ | $54.417f$ |
| $2.997f$ | $\leq$ | $-R_6$ | $\leq$ | $3.007f$ |
| $2.997f$ | $\leq$ | $-R_7$ | $\leq$ | $3.007f$ |
| $6.109f$ | $\leq$ | $R_8$ | $\leq$ | $6.130f$ |
| $6.634f$ | $\leq$ | $R_9$ | $\leq$ | $6.657f$ |
| $5.5980f$ | $\leq$ | $-R_{10}$ | $\leq$ | $6.000f$ |
| $5.501f$ | $\leq$ | $R_{11}$ | $\leq$ | $5.519f$ |
| $10.146f$ | $\leq$ | $-R_{12}$ | $\leq$ | $10.180f$ |
| $7.098f$ | $\leq$ | $-R_{13}$ | $\leq$ | $7.173f$ |
| $21.023f$ | $\leq$ | $-R_{14}$ | $\leq$ | $22.045f$ |
| $1.662f$ | $\leq$ | $-R_{15}$ | $\leq$ | $1.674f$ |
| $3.467f$ | $\leq$ | $-R_{16}$ | $\leq$ | $3.804f$ |
| $2.485f$ | $\leq$ | $-R_{17}$ | $\leq$ | $2.605f$ |
| $-17.343f$ | $\geq$ | $R_{18}$ | $\geq$ | $60f$ |
| $-60f$ | $\geq$ | $R_{19}$ | $\geq$ | $35.265f$ |
| $4.753f$ | $\leq$ | $-R_{20}$ | $\leq$ | $5.106f$ |
| $0.569f$ | $\leq$ | $t_1$ | $\leq$ | $0.571f$ |
| $1.474f$ | $\leq$ | $t_2$ | $\leq$ | $1.479f$ |
| $0.720f$ | $\leq$ | $t_3$ | $\leq$ | $0.722f$ |
| $0.308f$ | $\leq$ | $t_4$ | $\leq$ | $0.309f$ |
| $1.499f$ | $\leq$ | $t_5$ | $\leq$ | $0.501f$ |
| $0.521f$ | $\leq$ | $t_6$ | $\leq$ | $0.523f$ |
| $0.310f$ | $\leq$ | $t_7$ | $\leq$ | $0.311f$ |
| $0.280f$ | $\leq$ | $t_8$ | $\leq$ | $0.281f$ |
| $0.359f$ | $\leq$ | $t_9$ | $\leq$ | $0.361f$ |
| $0.599f$ | $\leq$ | $t_{10}$ | $\leq$ | $0.601f$ |
| $0.019f$ | $\leq$ | $S_1$ | $\leq$ | $0.020f$ |
| $0.013f$ | $\leq$ | $S_2$ | $\leq$ | $0.014f$ |
| $0.064f$ | $\leq$ | $S_3$ | $\leq$ | $0.065f$ |
| $0.135f$ | $\leq$ | $S_4$ | $\leq$ | $0.136f$ |
| $0.018f$ | $\leq$ | $S_5$ | $\leq$ | $0.019f$ |
| $0.073f$ | $\leq$ | $S_6$ | $\leq$ | $0.089f$ |
| $7.046f$ | $\leq$ | $S_7$ | $\leq$ | $7.127f$ |
| $1.632f$ | $\leq$ | $S_8$ | $\leq$ | $1.754f$ |
| $0.009f$ | $\leq$ | $S_9$ | $\leq$ | $0.010f$ |
| $1.618$ | $\leq$ | $n_{D1}$ | $\leq$ | $1.622$ |
| $1.618$ | $\leq$ | $n_{D2}$ | $\leq$ | $1.622$ |
| $1.718$ | $\leq$ | $n_{D3}$ | $\leq$ | $1.722$ |
| $1.689$ | $\leq$ | $n_{D4}$ | $\leq$ | $1.693$ |
| $1.689$ | $\leq$ | $n_{D5}$ | $\leq$ | $1.693$ |
| $1.718$ | $\leq$ | $n_{D6}$ | $\leq$ | $1.722$ |
| $1.689$ | $\leq$ | $n_{D7}$ | $\leq$ | $1.693$ |
| $1.689$ | $\leq$ | $n_{D8}$ | $\leq$ | $1.693$ |
| $1.718$ | $\leq$ | $n_{D9}$ | $\leq$ | $1.722$ |
| $1.524$ | $\leq$ | $n_{D10}$ | $\leq$ | $1.528$ |
| $58.2$ | $\leq$ | $v_1$ | $\leq$ | $62.2$ |
| $58.2$ | $\leq$ | $v_2$ | $\leq$ | $62.2$ |
| $27.3$ | $\leq$ | $v_3$ | $\leq$ | $31.3$ |
| $52.8$ | $\leq$ | $v_4$ | $\leq$ | $56.8$ |
| $52.8$ | $\leq$ | $v_5$ | $\leq$ | $56.8$ |
| $27.3$ | $\leq$ | $v_6$ | $\leq$ | $31.3$ |
| $52.8$ | $\leq$ | $v_7$ | $\leq$ | $56.8$ |
| $52.8$ | $\leq$ | $v_8$ | $\leq$ | $56.8$ |
| $27.3$ | $\leq$ | $v_9$ | $\leq$ | $31.3$ |
| $58.0$ | $\leq$ | $v_{10}$ | $\leq$ | $62.0$ |

2. The lens of claim 1 having substantially the construction data set forth in the table below:

| | | | |
|---|---|---|---|
| $-R_1$ | $2.516f$ | $t_1$ | $0.571f$ |
| $R_2$ | $\pm 60f$ | $t_2$ | $1.479f$ |
| $R_3$ | $\pm 60f$ | $t_3$ | $0.722f$ |
| $-R_4$ | $2.024f$ | $t_4$ | $0.309f$ |
| $R_5$ | $54.417f$ | $t_5$ | $0.501f$ |
| $-R_6$ | $3.007f$ | $t_6$ | $0.523f$ |
| $-R_7$ | $3.007f$ | $t_7$ | $0.311f$ |
| $R_8$ | $6.130f$ | $T_8$ | $0.281f$ |
| $R_9$ | $6.657f$ | $t_9$ | $0.361f$ |
| $-R_{10}$ | $6.000f$ | $t_{10}$ | $0.601f$ |
| $R_{11}$ | $5.519f$ | $S_1$ | $0.019f$ |
| $-R_{12}$ | $10.180$ | $S_2$ | $0.014f$ |
| $-R_{13}$ | $7.173f$ | $S_3$ | $0.065f$ |
| $-R_{14}$ | $22.045f$ | $S_4$ | $0.136f$ |
| $-R_{15}$ | $1.666f$ | $S_5$ | $0.019f$ |
| $-R_{16}$ | $3.804f$ | $S_6$ | $0.073f$ |
| $-R_{17}$ | $2.485f$ | $S_7$ | $7.126f$ |
| $R_{18}$ | $-17.343f$ | $S_8$ | $1.632f$ |
| $R_{19}$ | $\pm 60f$ | $S_9$ | $0.010f$ |
| $-R_{20}$ | $4.753f$ | | |
| $n_{D1}$ | $1.620$ | $v_1$ | $60.2$ |
| $n_{D2}$ | $1.620$ | $v_2$ | $60.2$ |
| $n_{D3}$ | $1.720$ | $v_3$ | $29.3$ |
| $n_{D4}$ | $1.691$ | $v_4$ | $54.8$ |
| $n_{D5}$ | $1.691$ | $v_5$ | $54.8$ |
| $n_{D6}$ | $1.720$ | $v_6$ | $29.3$ |
| $n_{D7}$ | $1.691$ | $v_7$ | $54.8$ |
| $n_{D8}$ | $1.691$ | $v_8$ | $54.8$ |
| $n_{D9}$ | $1.720$ | $v_9$ | $29.3$ |
| $n_{D10}$ | $1.526$ | $v_{10}$ | $60.0$ |

3. The lens of claim 1 having substantially the construction data set forth in the table below:

| | | | |
|---|---|---|---|
| $-R_1$ | $2.362f$ | $t_1$ | $0.569f$ |
| $R_2$ | $\pm 60f$ | $t_2$ | $1.476f$ |
| $R_3$ | $\pm 60f$ | $t_3$ | $0.721f$ |
| $-R_4$ | $2.020f$ | $t_4$ | $0.309f$ |
| $R_5$ | $54.292f$ | $t_5$ | $0.500f$ |
| $-R_6$ | $3.000f$ | $t_6$ | $0.521f$ |
| $-R_7$ | $3.000f$ | $t_7$ | $0.310f$ |
| $R_8$ | $6.116f$ | $t_8$ | $0.280f$ |
| $R_9$ | $6.641f$ | $t_9$ | $0.360f$ |
| $-R_{10}$ | $5.987f$ | $t_{10}$ | $0.600f$ |
| $R_{11}$ | $5.507f$ | $S_1$ | $0.020f$ |
| $-R_{12}$ | $10.156f$ | $S_2$ | $0.014f$ |
| $-R_{13}$ | $7.116f$ | $S_3$ | $0.065f$ |
| $-R_{14}$ | $21.023f$ | $S_4$ | $0.136f$ |
| $-R_{15}$ | $1.674f$ | $S_5$ | $0.019f$ |
| $-R_{16}$ | $3.467f$ | $S_6$ | $0.089f$ |
| $-R_{17}$ | $2.602f$ | $S_7$ | $7.083f$ |
| $R_{18}$ | $\pm 60f$ | $S_8$ | $1.754f$ |
| $R_{19}$ | $35.265f$ | $S_9$ | $0.010f$ |
| $-R_{20}$ | $5.106f$ | | |
| $n_{D1}$ | $1.620$ | $v_1$ | $60.2$ |
| $n_{D2}$ | $1.620$ | $v_2$ | $60.2$ |
| $n_{D3}$ | $1.720$ | $v_3$ | $29.3$ |
| $n_{D4}$ | $1.691$ | $v_4$ | $54.8$ |
| $n_{D5}$ | $1.691$ | $v_5$ | $54.8$ |
| $n_{D6}$ | $1.720$ | $v_6$ | $29.3$ |
| $n_{D7}$ | $1.691$ | $v_7$ | $54.8$ |
| $n_{D8}$ | $1.691$ | $v_8$ | $54.8$ |
| $n_{D9}$ | $1.720$ | $v_9$ | $29.3$ |
| $n_{D10}$ | $1.526$ | $v_{10}$ | $60.0$ |

4. The lens of claim 1 having substantially the construction data set forth in the table below:

| | | | |
|---|---|---|---|
| $-R_1$ | $2.491f$ | $t_1$ | $0.569f$ |
| $R_2$ | $\pm 60f$ | $t_2$ | $1.474f$ |
| $R_3$ | $\pm 60f$ | $t_3$ | $0.720f$ |
| $-R_4$ | $2.018f$ | $t_4$ | $0.308f$ |
| $R_5$ | $54.235f$ | $t_5$ | $0.499f$ |
| $-R_6$ | $2.997f$ | $t_6$ | $0.521f$ |
| $-R_7$ | $2.997f$ | $t_7$ | $0.310f$ |
| $R_8$ | $6.109f$ | $t_8$ | $0.280f$ |
| $R_9$ | $6.634f$ | $t_9$ | $0.359f$ |
| $-R_{10}$ | $5.980f$ | $t_{10}$ | $0.599f$ |
| $R_{11}$ | $5.501f$ | $S_1$ | $0.020f$ |
| $-R_{12}$ | $10.146f$ | $S_2$ | $0.014f$ |
| $-R_{13}$ | $7.098f$ | $S_3$ | $0.065f$ |
| $-R_{14}$ | $21.882f$ | $S_4$ | $0.135f$ |
| $-R_{15}$ | $1.662f$ | $S_5$ | $0.018f$ |
| $-R_{16}$ | $3.563f$ | $S_6$ | $0.089f$ |
| $-R_{17}$ | $2.605f$ | $S_7$ | $7.127f$ |
| $R_{18}$ | $-33.440f$ | $S_8$ | $1.725f$ |
| $R_{19}$ | $\pm 60f$ | $S_9$ | $0.010f$ |
| $-R_{20}$ | $5.093f$ | | |
| $n_{D1}$ | $1.620$ | $v_1$ | $60.2$ |
| $n_{D2}$ | $1.620$ | $v_2$ | $60.2$ |
| $n_{D3}$ | $1.720$ | $v_3$ | $29.3$ |
| $n_{D4}$ | $1.691$ | $v_4$ | $54.8$ |
| $n_{D5}$ | $1.691$ | $v_5$ | $54.8$ |
| $n_{D6}$ | $1.720$ | $v_6$ | $29.3$ |
| $n_{D7}$ | $1.691$ | $v_7$ | $54.8$ |
| $n_{D8}$ | $1.691$ | $v_8$ | $54.8$ |
| $n_{D9}$ | $1.720$ | $v_9$ | $29.3$ |
| $n_{D10}$ | $1.526$ | $v_{10}$ | $60.0$ |

5. The lens of claim 1 having substantially the construction data set forth in the table below:

| | | | |
|---|---|---|---|
| $-R_1$ | $2.447f$ | $t_1$ | $0.569f$ |
| $R_2$ | $\pm 60f$ | $t_2$ | $1.474f$ |
| $R_3$ | $\pm 60f$ | $t_3$ | $0.720f$ |
| $-R_4$ | $2.018f$ | $t_4$ | $0.308f$ |
| $R_5$ | $54.242f$ | $t_5$ | $0.499f$ |
| $R_6$ | $2.997f$ | $t_6$ | $0.521f$ |
| $-R_7$ | $2.997f$ | $t_7$ | $0.310f$ |
| $R_8$ | $6.110f$ | $t_8$ | $0.280f$ |
| $R_9$ | $6.635f$ | $t_9$ | $0.360f$ |

| | | | | | | | |
|---|---|---|---|---|---|---|---|
| $-R_{10}$ | 5.981f | $t_{10}$ | 0.599f | $n_{D1}$ | 1.620 | $\nu_1$ | 60.2 |
| $R_{11}$ | 5.502f | $S_1$ | 0.020f | $n_{D2}$ | 1.620 | $\nu_2$ | 60.2 |
| $-R_{12}$ | 10.147f | $S_2$ | 0.014f | $n_{D3}$ | 1.720 | $\nu_3$ | 29.3 |
| $-R_{13}$ | 7.141f | $S_3$ | 0.065f | $n_{D4}$ | 1.691 | $\nu_4$ | 54.8 |
| $-R_{14}$ | 21.536f | $S_4$ | 0.135f | $n_{D5}$ | 1.691 | $\nu_5$ | 54.8 |
| $-R_{15}$ | 1.673f | $S_5$ | 0.018f | $n_{D6}$ | 1.720 | $\nu_6$ | 29.3 |
| $-R_{16}$ | 3.700f | $S_6$ | 0.089f | $n_{D7}$ | 1.691 | $\nu_7$ | 54.8 |
| $-R_{17}$ | 2.557f | $S_7$ | 7.046f | $n_{D8}$ | 1.691 | $\nu_8$ | 54.8 |
| $R_{18}$ | −27.281f | $S_8$ | 1.754f | $n_{D9}$ | 1.720 | $\nu_9$ | 29.3 |
| $R_{19}$ | ±60f | $S_9$ | 0.010f | $n_{D10}$ | 1.526 | $\nu_{10}$ | 60.0 |
| $-R_{20}$ | 4.860f | | | | | | |

* * * * *